US012555718B2

(12) United States Patent
De Mercato et al.

(10) Patent No.: US 12,555,718 B2
(45) Date of Patent: Feb. 17, 2026

(54) TRANSFORMER COIL BLOCK DESIGN FOR SEISMIC APPLICATION

(71) Applicant: Hitachi Energy Ltd, Zurich (CH)

(72) Inventors: Luigi De Mercato, Varese (IT); Boris-QingJun Sun, Shanghai (CN)

(73) Assignee: HITACHI ENERGY LTD, Zürich (CH)

( * ) Notice: Subject to any disclaimer, the term of this patent is extended or adjusted under 35 U.S.C. 154(b) by 965 days.

(21) Appl. No.: 17/773,324

(22) PCT Filed: Oct. 30, 2020

(86) PCT No.: PCT/EP2020/080601
§ 371 (c)(1),
(2) Date: Apr. 29, 2022

(87) PCT Pub. No.: WO2021/084112
PCT Pub. Date: May 6, 2021

(65) Prior Publication Data

US 2022/0392695 A1 Dec. 8, 2022

(30) Foreign Application Priority Data

Oct. 31, 2019 (EP) .................................... 19206556

(51) Int. Cl.
*H01F 27/28* (2006.01)
*H01F 27/30* (2006.01)
*H01F 41/04* (2006.01)

(52) U.S. Cl.
CPC ......... *H01F 27/303* (2013.01); *H01F 27/306* (2013.01); *H01F 41/04* (2013.01)

(58) Field of Classification Search
CPC ...... H01F 27/303; H01F 27/306; H01F 41/04; H01F 27/324

(Continued)

(56) References Cited

U.S. PATENT DOCUMENTS

2003/0038696 A1* 2/2003 Chui ....................... H01F 38/10 336/198
2005/0073385 A1* 4/2005 Wu ....................... H01F 27/325 336/208

(Continued)

FOREIGN PATENT DOCUMENTS

CN 102856050 A 1/2013
CN 105051838 A 11/2015

(Continued)

OTHER PUBLICATIONS

International Search Report and Written Opinion of the International Searching Authority, PCT/EP2020/080601, mailed Jan. 28, 2021, 14 pages.

(Continued)

*Primary Examiner* — Shawki S Ismail
*Assistant Examiner* — Kazi S Hossain
(74) *Attorney, Agent, or Firm* — Sage Patent Group

(57) ABSTRACT

The present disclosure relates to a coil block for supporting at least one coil winding in an electrical transformer, wherein the at least one coil winding is arranged concentrically about a longitudinal axis, the coil block including: a first element having at least one supporting surface for contacting the at least one coil winding and a first clamping surface; and a second element having a fastening means and a second clamping surface for contacting the first clamping surface, wherein the fastening means restricts rotation of the coil block about an axis parallel to the longitudinal axis of the at least one coil winding, and wherein the first clamping surface is a recess configured for accepting the second element, wherein the recess extends in a radial direction perpendicular to the longitudinal axis such that rotation of the second element with respect to the first element is restricted.

18 Claims, 4 Drawing Sheets

(58) Field of Classification Search
USPC .......................................... 336/182, 5–60, 221
See application file for complete search history.

(56) References Cited

U.S. PATENT DOCUMENTS

| | | | | |
|---|---|---|---|---|
| 2006/0017537 | A1* | 1/2006 | Prieto Colmenero .. | H01F 29/02 336/147 |
| 2007/0159288 | A1* | 7/2007 | Chang ...................... | H01F 30/06 336/212 |
| 2007/0171021 | A1* | 7/2007 | Scherrer ............... | H01F 29/025 336/200 |
| 2010/0201472 | A1* | 8/2010 | Le ......................... | H01F 27/363 29/606 |
| 2012/0257419 | A1 | 10/2012 | Kaneko | |

FOREIGN PATENT DOCUMENTS

| | | | | |
|---|---|---|---|---|
| CN | 205487731 | U | 8/2016 | |
| CN | 108597810 | A | 9/2018 | |
| EP | 3176796 | A1 | 6/2017 | |
| EP | 3490102 | B1 * | 8/2020 | .............. H02J 50/50 |
| EP | 3176796 | B1 * | 10/2020 | ........... H01F 27/306 |
| JP | S5484521 | U | 6/1979 | |
| JP | S58-72825 | U | 5/1983 | |
| JP | S59-6822 | A | 1/1984 | |
| JP | S60-65505 | A | 4/1985 | |
| JP | S61146930 | U | 9/1986 | |
| JP | S62-199919 | U | 12/1987 | |
| JP | H05-335157 | A | 12/1993 | |
| JP | H 6-20852 | A | 1/1994 | |
| JP | 2017135300 | A | 8/2017 | |
| JP | 2018078194 | A | 5/2018 | |
| JP | 2018110176 | A | 7/2018 | |
| JP | 2019-121758 | A | 7/2019 | |
| KR | 20110031682 | A | 3/2011 | |
| KR | 200484481 | Y1 | 9/2017 | |
| WO | 2016017381 | A1 | 2/2016 | |

OTHER PUBLICATIONS

Extended European Search Report dated May 12, 2020 for European Patent Application No. 19206556.3, May 12, 2020, 9 pages.
First Office Action, Chinese Patent Application No. 2020800726214, mailed Feb. 28, 2025, 6 pages.
Notice of Reasons for Refusal for Japanese Patent Application No. 2022-525471, mailed Jul. 25, 2023, 4 pages.
Japanese Office Action and English Translation, Japanese Patent Application No. 2022-525471, mailed Dec. 28, 2023, 10 pages.
Decision of Refusal, Japanese Patent Application No. 2022-525471, mailed Apr. 12, 2024, 14 pages.

* cited by examiner

TRANSFORMER COIL BLOCK DESIGN FOR SEISMIC APPLICATION

CROSS REFERENCE TO RELATED APPLICATIONS

This application is a 35 U.S.C. § 371 national stage application of PCT International Application No. PCT/EP2020/080601 filed on Oct. 30, 2020, which in turn claims foreign priority to European Patent Application No. 19206556.3, filed on Oct. 31, 2019, the disclosures and content of which are incorporated by reference herein in their entirety.

FIELD OF THE DISCLOSURE

Embodiments of the present disclosure generally relate to a coil block for supporting a coil winding in a transformer, particularly for providing support of a coil winding subjected to vibrational loading, particularly under seismic conditions. Further embodiments of the present disclosure generally relate to an electrical transformer having at least one coil block according to the present disclosure.

TECHNICAL BACKGROUND

High-voltage transformers typically include a number of coil windings which are supported by coil blocks. Typical coil blocks of a high-voltage transformer provide mechanical support of the coil blocks as well as electrical insulation of the coil blocks from surrounding components. As exemplarily shown in FIG. 1, a typical high-voltage transformer arrangement is provided with at least one primary coil winding and at least one secondary coil winding. The longitudinal axis of the at least one primary coil winding and the at least one secondary coil winding is arranged vertically. The primary and secondary coil windings are supported by coil blocks provided between a lower end of the coil windings and the lower support structure, and between an upper end of the coil windings and the upper support structure. The upper and lower coil blocks provide the primary and secondary coil windings with sufficient stiffness to prevent vertical motion of the coil windings relative to the upper and lower support structure.

Transformer coil blocks may mechanically support the coil windings of the transformer. However, certain loading conditions are problematic when using blocks according to the current state of the art. For example, seismic loading of a transformer may induce destructive vibrations which may damage the coil windings, the coil blocks, or other components of the transformer. It is typically recommended that the transformer, particularly the coil windings and coil blocks, is designed to have a minimum resonance frequency, for example, above 33 Hz so as to minimize the residual acceleration peaks on system components and to therefore minimize stresses and forces transmitted through the various bolted and welded connections of the transformer. However, even with these design considerations accounted for, vibrational loads, in particularly seismically-induced vibrations, may cause the coil block to move or rotate such that the supporting contact between the coil block and the coil winding is lost, modifying the resonance frequency of the coil windings such that the vibration loads may be destructive.

In view of the technical problems discussed above, it is desired to overcome at least some of the problems in the prior art. Particularly, it is desired to provide a coil block for an electrical transformer with improved mechanical performance when subjected to seismic loadings.

SUMMARY OF THE DISCLOSURE

An aspect of the present disclosure provides a coil block for supporting at least one coil winding in an electrical transformer. The coil block comprises a first element having at least one supporting surface for contacting the at least one coil winding and a first clamping surface, and a second element having a fastening means and a second clamping surface for contacting the first clamping surface, wherein the fastening means restricts rotation of the coil block about an axis parallel to the longitudinal axis of the at least one coil winding.

A further aspect of the present disclosure provides an electrical transformer comprising at least one primary coil winding, at least one secondary coil winding, and at least one coil block according to the above aspect.

The embodiments described in the present disclosure allow for the coil block to have improved mechanical performance when subjected to seismic loadings. Particularly, the embodiments described in the present disclosure allow for the coil block to be prevented from moving or rotating under seismic loading, so that the coil windings of the transformer remain properly supported.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Figure 1:
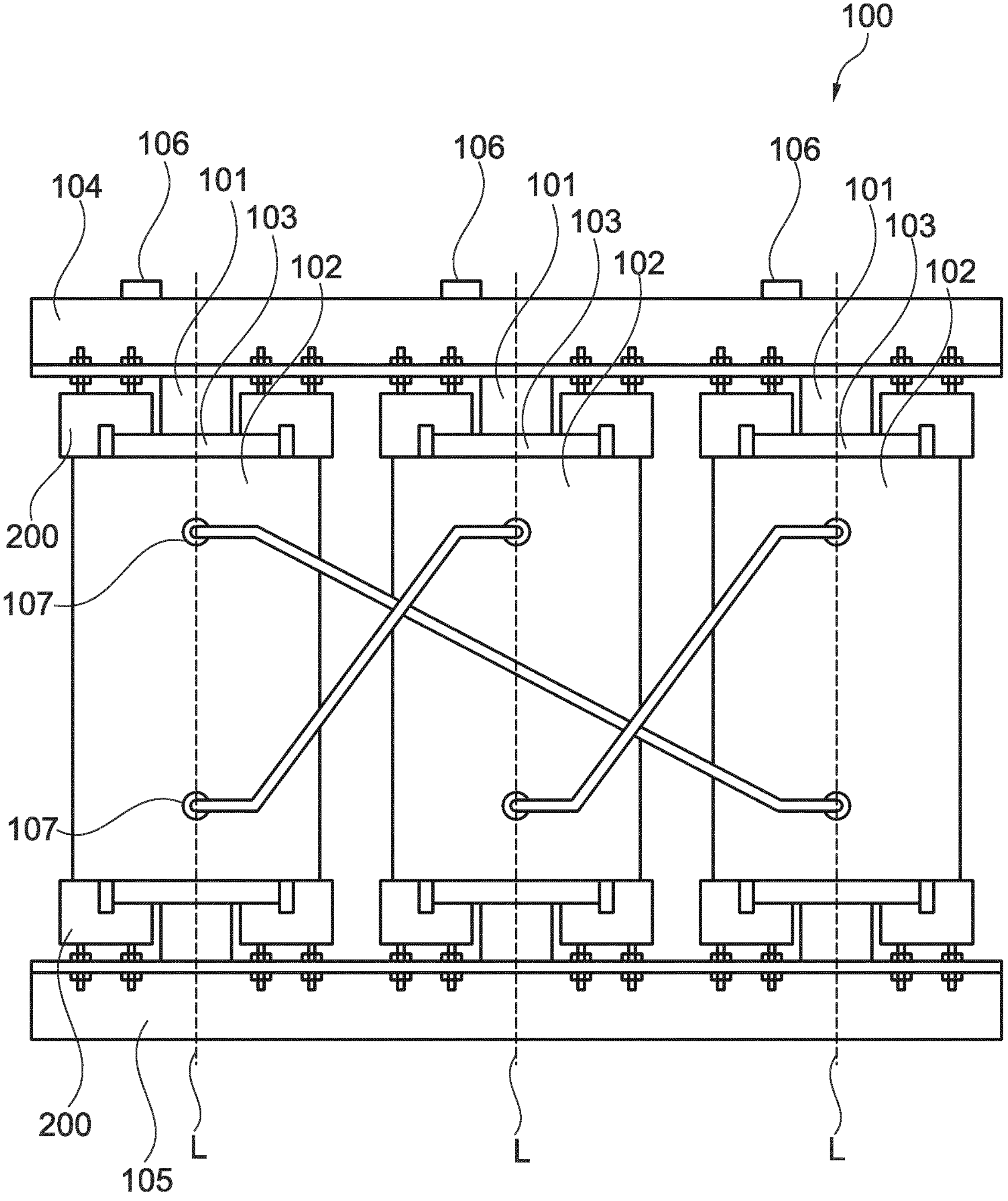
FIG. 1 is a schematic side view of a transformer according to embodiments of the present disclosure.

FIG. 1 shows a schematic side view of a transformer according to an aspect of the present disclosure. Transformer 100 is exemplarily shown as a three-phase transformer, but the present disclosure is not limited thereto. Transformer 100 may be configured for medium voltage or high voltage operation. In the context of the present disclosure, medium voltage refers to a voltage of at least 1 kV and up to 52 kV, and high voltage refers to a voltage of at least 52 kV. Transformer 100 may be used in electrical power distribution applications, for example, in a distribution substation.

Each phase of the exemplary three-phase transformer 100 includes a primary coil winding 102 and a secondary coil winding 103. As exemplarily shown, primary coil winding 102 and secondary coil winding 103 have a longitudinal axis L, and are arranged concentrically about longitudinal axis L. Primary and secondary coil windings 102, 103 are respectively provided with at least one primary terminal 106 and at least one secondary terminal 107 for connecting to a power distribution network. Primary and secondary coil windings 102, 103 may be further provided with at least one insulation layer. Transformer 100 further includes at least one core element 101 arranged within the secondary coil winding 103. In the exemplary three-phase transformer 100, the core assembly may include an E-shaped portion including three core elements 101, and a yoke portion assembled to the E-shaped portion.

Transformer 100 further includes support beams configured for supporting components of transformer 100. Transformer 100 includes at least an upper support beam 104 and at least a lower support beam 105. Upper and lower support beams 104, 105 are arranged to support the core assembly, the at least one primary coil winding 102 and the at least one secondary coil winding 103. Upper and lower support beams 104, 105 may include one or more beam-like elements sized and arranged so as to withstand the mass of the core assembly and primary and secondary coil windings 102, 103, as well as the clamping forces which clamp the transformer components. For example, upper and lower support beams 104, 105 may each include two elements between which the yoke portions of the core assembly are clamped.

Arranged between upper and lower support beams 104, 105 and the at least one primary coil winding 102 and the at least one secondary coil winding 103 are coil blocks 200. Coil blocks 200 are configured for supporting and clamping the at least one primary coil winding 102 and the at least one secondary coil winding 103 between the upper and lower support beams 104, 105. Particularly, a plurality of coil blocks 200 are arranged at an upper side between primary and secondary coil windings 102, 103 and upper support beam 104, and a plurality of coil blocks 200 are arranged at a lower side between primary and secondary coil windings 102, 103 and lower support beam 105. Typically, the coil blocks 200 which are arranged on the upper and lower side are identical.

According to an aspect of the present disclosure, an electrical transformer 100 is provided, the electrical transformer 100 comprising at least one primary coil winding 102, at least one secondary coil winding 103 and at least one coil block 200 according to embodiments described herein.

Figure 2:
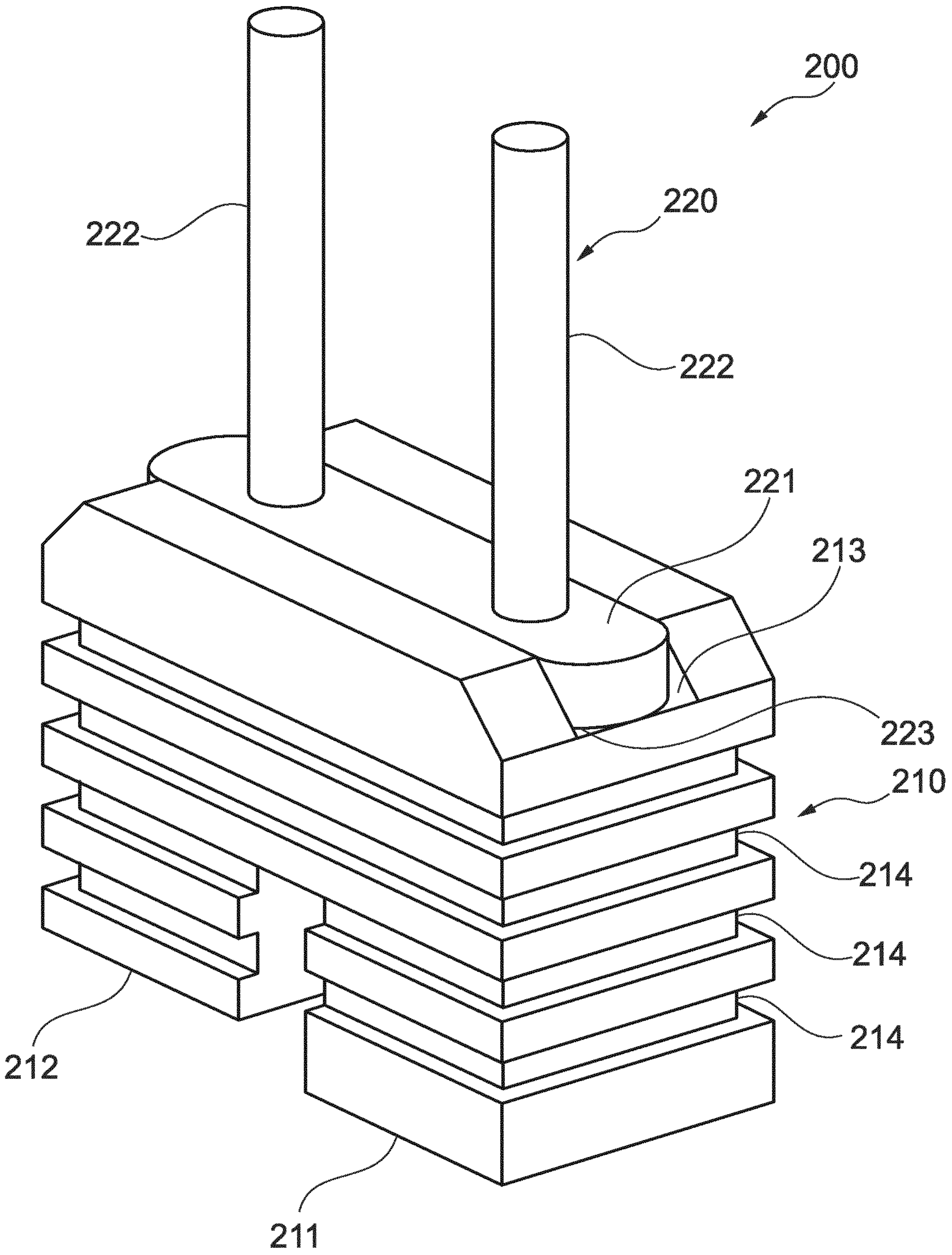
FIG. 2 is a perspective view of a coil block according to embodiments of the present disclosure.
Figure 3A:
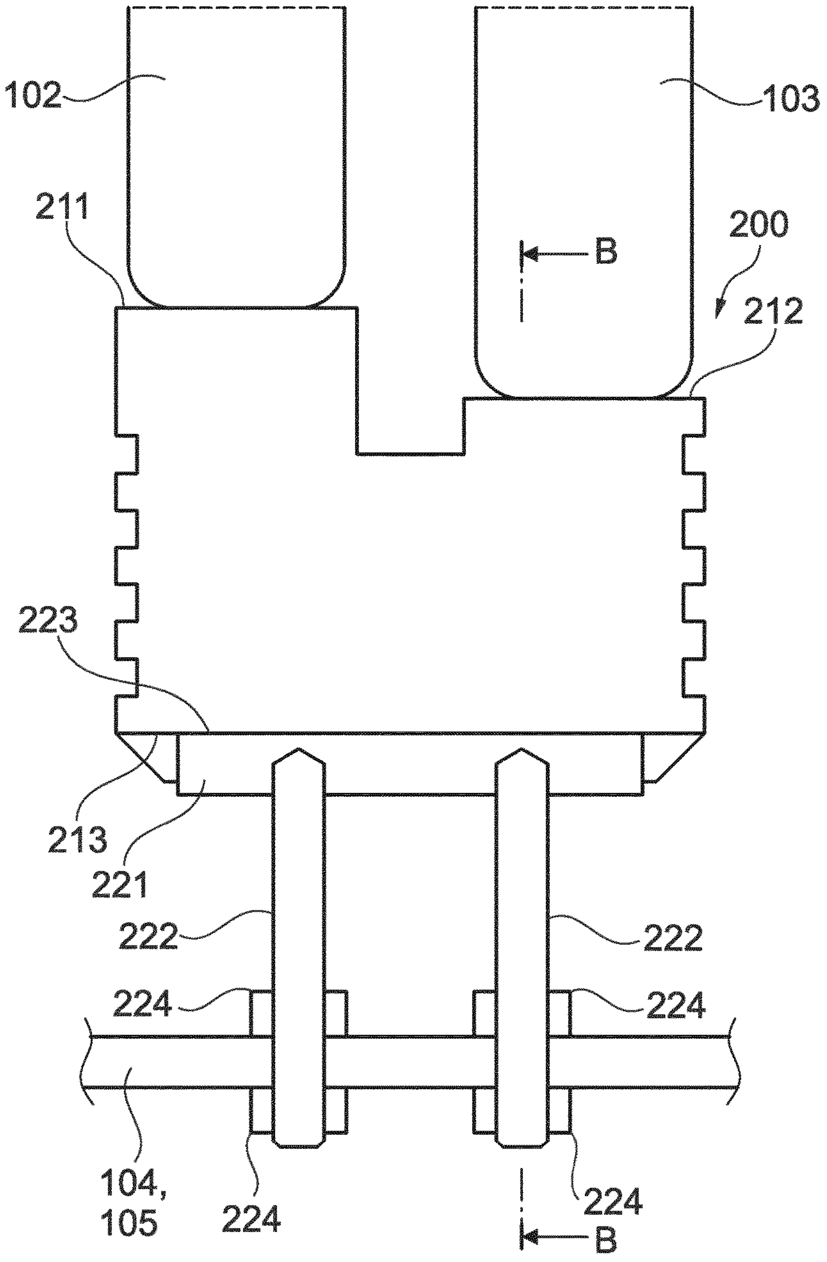
FIG. 3A-3B are schematic cross-sectional views of a coil block according to embodiments of the present disclosure.
Figure 3B:
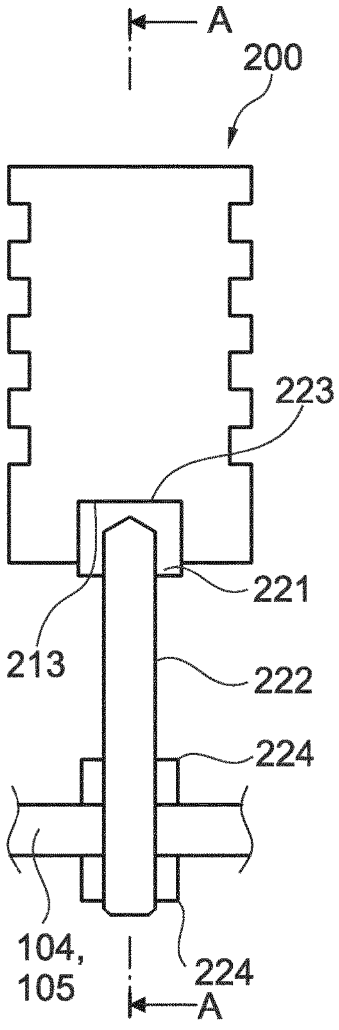

FIG. 2 shows a perspective view of a coil block 200 according to embodiments of the present disclosure. The perspective view shows the coil block 200 in an orientation corresponding to a coil block 200 arranged at an upper side of transformer 100. Further reference is made to FIGS. 3A and 3B, which show cross-sectional views of coil block 200. FIG. 3A is a cross-sectional view through section A-A, and FIG. 3B is a cross-sectional view through section B-B.

According to an aspect of the present disclosure a coil block 200 for supporting at least one coil winding 102, 103 in an electrical transformer 100 is provided. The coil block 200 includes a first element 210 having at least one supporting surface 211, 212 for contacting the at least one coil winding 102, 103 and a first clamping surface 213, and a second element 210 having a fastening means 222 and a second clamping surface 223 for contacting the first clamping surface 213, wherein the fastening means 222 restricts rotation of the coil block about an axis parallel to the longitudinal axis L of the at least one coil winding 102, 103.

First element 210 and second element 220 are configured to provide a clamping force for supporting and clamping coil windings 102, 103. Particularly, second element 220 is fastened to a support structure, for example fastened to upper or lower support beam 104, 105, and applies a clamping load to first element 210. The clamping load is substantially in the direction corresponding to the longitudinal axis L of the coil windings 102, 103. Coil block 200 is further provided with a fastening means 222 which is arranged to fasten second element 220 to a support structure, such that the coil block is restricted from rotating. By preventing coil block 200 from rotating, a transformer being subjected to vibrational loads will not cause the coil block 200 to rotate and/or move into a position in which the at least one coil winding 102, 103 is no longer supported by the coil block 200. Thus, coil block 200 improves the mechanical performance of the transformer when subjected to vibrational loadings, particularly seismic loadings, thereby preventing damage of the coil windings 102, 103 under vibrational loadings.

First element 210 is provided with a first clamping surface 213, and second element 220 is provided with a second clamping surface 223 for contacting the first clamping surface 213. Second element 220 is configured to apply a clamping load to first element 210 through the first and second clamping surfaces 213, 223 such that first element 210 and second element 220 do not move with respect to each other. Further, due to fastening means 222, second element 220 is restricted in moving and rotating in any direction, in particular restricted in rotating along the longitudinal axis L of the at least one coil winding 102, 103. Thus, the clamping load applied by the second element 220 to the first element 210 serves to also restrict the movement and rotation of the first element 210.

First clamping surface 213 and second clamping surface 223 may contact each other in such a way as to prevent rotation and movement therebetween. For example, first and second clamping surfaces 213, 223 may be flat surfaces which prevent rotation and movement therebetween by friction. In this case, the clamping load applied by second element 220 to first element 210 is not only provided to clamp the coil windings 102, 103, but also to increase the friction load between first clamping surface 213 and second clamping surface 223. Such an arrangement allows for the greatest flexibility for adjusting the relative positions of the first and second elements 210, 220 during assembly of transformer 100 to account for irregularities and tolerances. Alternatively, first and second clamping surfaces 213, 223 may be bonded together to restrict movement and rotation therebetween, for example with an adhesive. The bonding may be performed prior to assembly of the transformer 100 such that the coil block 200 is manufactured as a single assembly, or during assembly of the transformer 100 such that the relative positions of the first and second elements 210, 220 may be adjusted to suit.

According to an embodiment, which may be combined with other embodiments described herein, first clamping surface 213 may include a recess configured for accepting the second element 220 such that rotation of the second element 220 with respect to the first element 210 is restricted. In the coil block 200 as exemplarily shown in the figures, first element 210 is provided with a groove in which second element 220 is arranged, such that rotation of second element 220 with respect to first element 210 is restricted. This is the preferred embodiment for first and second clamping surfaces 213, 223 for a number of reasons. In the case where friction between first and second clamping surfaces 213, 223 is provided, a higher clamping load is applied by the second element 220 to first element 210 to ensure that movement and rotation between the first and second clamping surfaces 213, 223 is restricted. A higher clamping load increases the loading applied to coil windings 102, 103. In the case where the first and second elements 210, 220 are bonded, the bonded assembly is less flexible and non-adjustable compared to a non-bonded assembly.

According to an embodiment, which may be combined with other embodiments described herein, the recess extends in a radial direction perpendicular to the longitudinal axis L of the at least one coil winding 102, 103. A radially-extending recess allows for relative movement between first and second element 210, 220 such that the radial position of first element 210 with respect to the at least one coil winding 102, 103 may be adjusted during assembly of transformer 100. Further, thermal expansion of the at least one coil winding 102, 103 causes the at least one coil winding 102, 103 to expand in the radial direction, which may be accounted for by radial sliding movement between the first and second elements 210, 220.

The recess provided on first clamping surface 213 is exemplarily shown as being a groove having open ends, providing a large amount of relative movement between the first and second elements 210, 220. However, the recess may instead be a groove having closed ends such that the radial sliding movement between first and second element 210, 220 is restricted or prevented completely. Particularly, the recess may be a groove being closed at the inner radial end and open at the outer radial end, such that first element 210 is provided with a large amount of relative sliding movement in the radially-inside direction, but is prevented from sliding in the radially-outside direction.

First element 210 is provided for supporting and clamping the at least one coil winding 102, 103. In the exemplary coil block 200 shown in FIGS. 2, 3A and 3B, first element 210 is shown as having two supporting surfaces 211, 212 for supporting two coil windings 102, 103. According to an embodiment, which may be combined with other embodiments described herein, the at least one supporting surface 211, 212 may include a primary supporting surface 211 for contacting a primary coil winding 102 and a secondary supporting surface 212 for contacting a secondary coil winding 103. However, the present disclosure is not limited thereto, and first element 210 may be provided with any number of supporting surfaces for supporting any number of coil windings.

First element 210 may be manufactured from any suitable material which provides sufficient mechanical strength and is electrically insulating. According to an embodiment, which may be combined with other embodiments described herein, first element 210 includes a polymeric, electrically-insulating material. Particularly, first element 210 may include an epoxy resin material. A polymeric material, particularly an epoxy resin material, provides mechanical strength for supporting and clamping one or more coil windings, but also electrically isolates the coil windings from the supporting structure of the transformer.

The electrical isolation performance of coil block 200 may be further improved by providing first element 210 with features which improve the distribution of the electrical field around coil block 200. According to an embodiment, which may be combined with other embodiments described herein, first element 210 further includes a plurality of perimeter contours 214 configured for reducing the gradient of an electric field. As exemplarily shown in FIG. 2, the plurality of perimeter contours 214 are a plurality of grooves provided around the perimeter of first element 210. However, the present disclosure is not limited thereto. For example, the plurality of perimeter contours 214 may include a plurality of triangular roof protrusions, a plurality of rounded protrusions, or a combination of protrusions and grooves. Such perimeter contours provide a mechanism for the electric field to be graded along the coil block 200 so that regions of highly concentrated electrical field are reduced or eliminated.

In the exemplary embodiment shown in the figures, second element 220 includes a clamping bar 221 which is in a substantially rectangular bar form, however the present disclosure is not limited thereto. A clamping bar 221 having any shape which serves to restrict rotation between first element 210 and second element 220 may be used. For example, clamping bar 221 could include a round bar with a corresponding round groove provided in first element 210, or any other shape which fits into a correspondingly-shaped recess provided in first element 210. Clamping bar 221 is typically made of a metal. Particularly, clamping bar 221 may be made from a non-magnetic metal such that second element 220 is not affected by magnetic flux generated in transformer 110.

Second element 220 is provided with a fastening means 222 which serves to fasten second element 220 to a supporting structure of transformer 100 in a way which restricts the rotation of coil block 200. According to an embodiment, which may be combined with other embodiments described herein, the fastening means 222 includes a first fastener and a second fastener. As exemplarily shown in the figures, the first fastener and second fastener may include threaded members spaced in the radial direction perpendicular to the longitudinal axis L of the at least one coil winding 102, 103. Particularly, first fastener and second fastener may be threaded studs which are welded to clamping bar 221. Threaded nuts 224 may be provided on first and second fasteners such that second element 220 may be fastened to a supporting structure, particularly upper or lower support beam 104, 105. Two threaded nuts 224 per threaded member may be provided on either side of upper or lower support beam 104, 105, however only one threaded nut 224 is essential for providing a clamping force between the first and second elements 210, 220. Adjustment of threaded nuts 224 serve to increase or decrease the clamping load applied between first and second element 210, 220, and thus to increase or decrease the clamping load applied by coil block 200 to the at least one coil winding 102, 103.

However, the present disclosure is not limited to fastening means 222 comprising two threaded fasteners. According to an embodiment, which may be combined with other embodiments herein, fastening means 222 may include one threaded fastener and at least one pin. The threaded fastener may be provided with threaded nuts 224 which can be adjusted to increase or decrease the load applied between first and second element 210, 220, and the at least one pin may be provided to engage with a corresponding hole in the upper or lower support beam 104, 105 to prevent rotation of coil block 200. Alternatively, fastening means 222 may include other means for applying a clamping load which are not threaded members, including wedges or shims inserted between upper or lower support beam 104, 105 and second element 220.

The vibrational loads which may be applied to transformer 100, particularly under seismic conditions, may be applied not only in the vertical direction parallel to longitudinal axis L of the at least one coil winding 102, 103, but also in the radial direction perpendicular to the longitudinal axis L of the at least one coil winding 102, 103. Coil block 200 may be provided with additional features to further restrict movement of the at least one coil winding 102, 103 in the radial direction so that coil block 200 maintains support and contact with the at least one coil winding 102, 103. Reference is now made to FIGS. 4A-4D, which show various means for restricting radial movement between the at least one coil winding 102, 103 and coil block 200. FIGS. 4A-4D show cross-sectional views of coil block 200 through section A-A.

According to an embodiment, which may be combined with other embodiments described herein, the at least one supporting surface 211, 212 comprises a coil recess configured for restricting the at least one coil winding in the radial direction. The coil recess may be formed by protrusions 215 provided on each side of the at least one supporting surface 211, 212 surrounding the at least one coil winding 102, 103. Providing a coil recess on the at least one supporting surface 211, 212 restricts or prevents radial movement of the at least one coil winding 102, 103 with respect to coil block 200. Under vibrational loads having a vibrational component in the radial direction, the coil recess prevents the at least one coil winding 102, 103 from moving into a position in which the coil block 200 no longer supports or clamps the at least one coil winding 102, 103, thereby further reducing damage of the at least one coil winding 102, 103 when transformer 100 is subjected to vibrational loads.

Figure 4A:
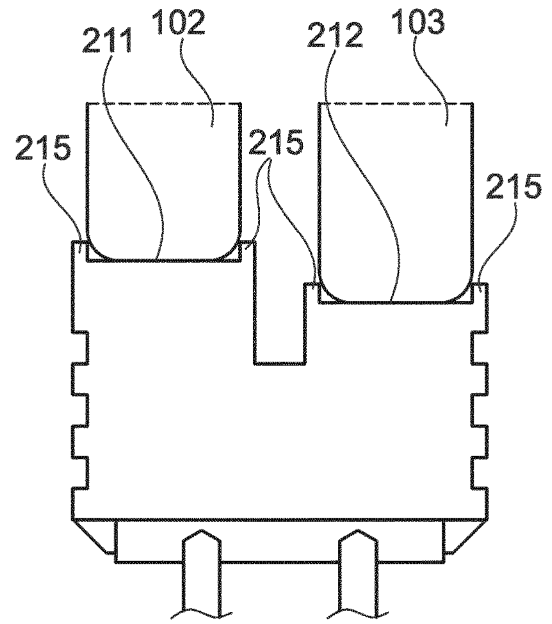
FIGS. 4A-4D are schematic cross-sectional views of a coil block according to embodiments of the present disclosure.
Figure 4B:
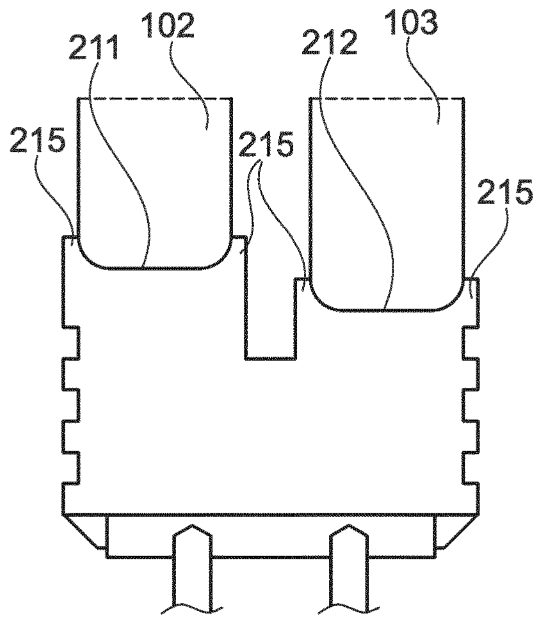
Figure 4C:
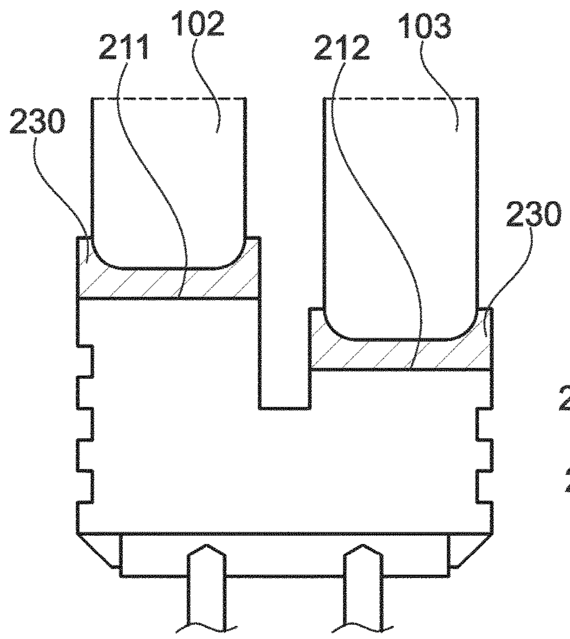
Figure 4D:
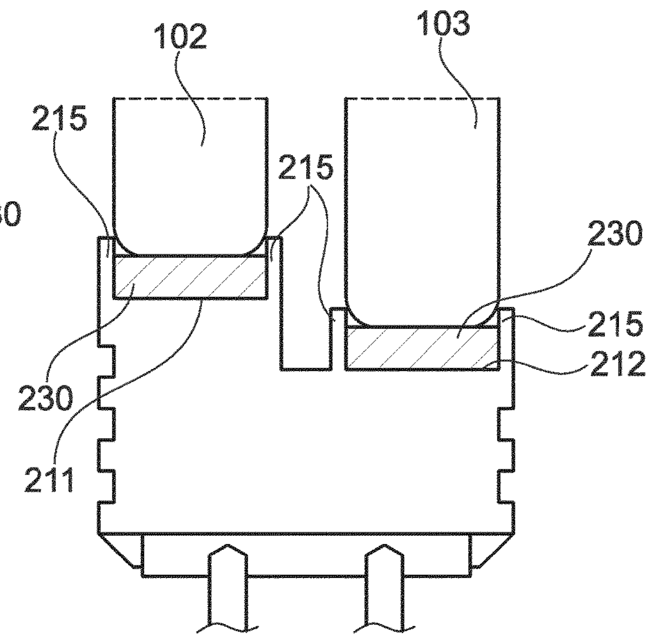

The coil recess exemplarily shown in FIG. 4A is provided by protrusions 215 and support surfaces 211, 212 such that the coil recess has a rectangular profile. Depending on the distance between the protrusions 215 and the at least one coil winding 102, 103, some radial movement may be allowed, for example, to account for thermal expansion of the at least one coil winding 102, 103.

Alternatively, further improved support of the at least one coil winding 102, 103 may be provided by matching the shape of the coil recess to the shape of the at least one coil winding 102, 103. According to an embodiment, which may be combined with other embodiments described herein, the coil recess has a profile corresponding to the profile of an end portion of the at least one coil winding 102, 103. Matching the profiles of the coil recess and the end portion of the at least one coil winding 102, 103 allows for more distributed support of the coil winding, reducing concentrated stresses applied to first element 210.

According to an embodiment, which may be combined with other embodiments described herein, coil block 200 may further include at least one supporting pad 230 arranged between the at least one supporting surface 211, 212 and the at least one coil winding 102, 103. Support pad 230 is exemplarily shown in FIG. 4C as being arranged between a flat support surface 211, 212, and is further exemplarily shown in FIG. 4D as being arranged in a coil recess provided by protrusions 215. Support pad 230 may be manufactured from a compliant material which elastically deforms to suit the profile of the at least one coil winding 102, 102. For example, support pad 230 may be manufactured from rubber or silicone.

Support pad 230 may be provided to improve the friction between the at least one supporting surface 211, 212 and the at least one coil winding 102, 103 such that vibrational loadings having a radial component are absorbed. The material of support pad 230 may be selected so as to optimize the resonance frequency at which the at least one coil winding 102, 103 vibrates. Support pad 230 may be bonded to the at least one supporting surface 211, 212, for example using an adhesive. Further, the elastic property of support pad 230 allows for manufacturing tolerances in the longitudinal direction L of the at least one coil winding 102, 103 to be absorbed.

The following items refer to further embodiments:

1. Coil block for supporting at least one coil winding in an electrical transformer (100), the coil block comprising:
   a first element having at least one supporting surface for contacting the at least one coil winding and a first clamping surface; and
   a second element having a fastening means and a second clamping surface for contacting the first clamping surface,
   wherein the fastening means restricts rotation of the coil block about an axis parallel to the longitudinal axis of the at least one coil winding.
2. The coil block according to item 1, wherein the first clamping surface is a recess configured for accepting the second element such that rotation of the second element with respect to the first element is restricted.
3. The coil block according to item 2, wherein the recess extends in a radial direction perpendicular to the longitudinal axis.
4. The coil block according to any of items 1 to 3, wherein the at least one supporting surface comprises a coil recess configured for restricting the at least one coil winding in a radial direction perpendicular to the longitudinal axis.
5. The coil block according to item 4, wherein the coil recess has a profile corresponding to the profile of an end portion of the at least one coil winding.
6. The coil block according to any of items 1 to 5, wherein the at least one supporting surface includes a primary supporting surface for contacting a primary coil winding and a secondary supporting surface for contacting a secondary coil winding.
7. The coil block according to any of items 1 to 6, further comprising at least one supporting pad arranged between the at least one supporting surface and the at least one coil winding.
8. The coil block according to any one of items 1 to 7, wherein the fastening means comprises a first fastener and a second fastener.
9. The coil block according to any one of items 1 to 7, wherein the fastening means comprises a first fastener and a first pin.
10. The coil block according to any one of items 1 to 9, wherein the fastening means is configured for applying a clamping force to the at least one coil winding.
11. The coil block according to any one of items 1 to 10, wherein the first element comprises a polymeric, electrically-insulating material, particularly an epoxy resin material.
12. The coil block according to any one of items 1 to 11, wherein the first element further comprises a plurality of perimeter contours configured for reducing the gradient of an electric field.

13. Electrical transformer comprising:
at least one primary coil winding;
at least one secondary coil winding; and
at least one coil block according to any one of items 1 to 12.

While the foregoing is directed to aspects and embodiments of the disclosure, other and further embodiments of the disclosure may be devised without departing from the basic scope thereof, and the scope thereof is determined by the claims that follow.

The invention claimed is:

1. A coil block for supporting at least one coil winding in an electrical transformer, the at least one coil winding arranged concentrically about a longitudinal axis, the coil block comprising:
a first element having at least one supporting surface for contacting the at least one coil winding and a first clamping surface; and
a second element having a fastening means, the fastening means comprising a first fastener and a second fastener, and a second clamping surface for contacting the first clamping surface,
the fastening means restricting rotation of the coil block about an axis parallel to the longitudinal axis of the at least one coil winding, and
the first clamping surface comprising a recess configured for accepting the second element, the recess extending in a radial direction perpendicular to the longitudinal axis such that rotation of the second element with respect to the first element is restricted, wherein the recess is configured to allow for relative movement between the first element and the second element.

2. The coil block according to claim 1, wherein the at least one supporting surface comprises a coil recess configured for restricting the at least one coil winding in a radial direction perpendicular to the longitudinal axis.

3. The coil block according to claim 2, wherein the coil recess has a profile corresponding to the profile of an end portion of the at least one coil winding.

4. The coil block according to claim 1, wherein the at least one supporting surface includes a primary supporting surface for contacting a primary coil winding and a secondary supporting surface for contacting a secondary coil winding.

5. The coil block according to claim 1, further comprising at least one supporting pad arranged between the at least one supporting surface and the at least one coil winding.

6. The coil block according to claim 1, wherein the second fastener comprises a first pin.

7. The coil block according to claim 1, wherein the fastening means is configured for applying a clamping force to the at least one coil winding.

8. The coil block according to claim 1, wherein the first element comprises a polymeric, electrically-insulating material, particularly an epoxy resin material.

9. The coil block according to claim 1, wherein the first element further comprises a plurality of perimeter contours configured for reducing a gradient of an electric field.

10. Electrical transformer comprising:
at least one primary coil winding;
at least one secondary coil winding; and
at least one coil block according to claim 1.

11. An electrical transformer comprising:
at least one coil winding arranged concentrically about a longitudinal axis; and
a coil block supporting the at least one coil winding, the coil block comprising:
a first element having at least one supporting surface for contacting the at least one coil winding and a first clamping surface; and
a second element having a first fastener, a second fastener, and a second clamping surface for contacting the first clamping surface,
the first fastener and the second fastener restricting rotation of the coil block about an axis parallel to the longitudinal axis of the at least one coil winding, and
the first clamping surface comprising a recess configured for accepting the second element, the recess extending in a radial direction perpendicular to the longitudinal axis such that rotation of the second element with respect to the first element is restricted, wherein the recess is configured to allow for relative movement between the first element and the second element.

12. The transformer according to claim 11, wherein the at least one supporting surface comprises a coil recess configured for restricting the at least one coil winding in a radial direction perpendicular to the longitudinal axis.

13. The transformer according to claim 12, wherein the coil recess has a profile corresponding to the profile of an end portion of the at least one coil winding.

14. The transformer according to claim 11, wherein the at least one supporting surface includes a primary supporting surface for contacting a primary coil winding and a secondary supporting surface for contacting a secondary coil winding.

15. The transformer according to claim 11, further comprising at least one supporting pad arranged between the at least one supporting surface and the at least one coil winding.

16. The transformer according to claim 11, wherein the second fastener comprises a first pin.

17. The transformer according to claim 11, wherein the first fastener and the second fastener are configured for applying a clamping force to the at least one coil winding.

18. A method comprising:
providing at least one coil winding arranged concentrically about a longitudinal axis;
contacting the at least one coil winding and a first clamping surface with a first supporting surface of a first element of a coil block;
fastening a second clamping surface of a second element of the coil block to the first clamping surface with a first fastener and a second fastener to restrict rotation of the coil block about an axis parallel to the longitudinal axis of the at least one coil winding; and
accepting the second element in a recess of the first clamping surface, the recess extending in a radial direction perpendicular to the longitudinal axis such that rotation of the second element with respect to the first element is restricted, wherein the recess is configured to allow for relative movement between the first element and the second element.

* * * * *